(12) United States Patent
Nishida (10) Patent No.: US 6,519,007 B1
(45) Date of Patent: Feb. 11, 2003

(54) VIDEO DATA TRANSMITTING METHOD (75) Inventor: Shinsuke Nishida, Tokyo (JP)

(73) Assignee: Fourie Inc., Tokyo (JP)

( * ) Notice: Subject to any disclaimer, the term of this patent is extended or adjusted under 35 U.S.C. 154(b) by 0 days.

(21) Appl. No.: 09/161,382

(22) Filed: Sep. 28, 1998

(30) Foreign Application Priority Data

Sep. 26, 1997 (JP) .............................................. 9-279505
Aug. 24, 1998 (JP) ........................................... 10-237728

(51) Int. Cl.$^7$ ............................. H04N 7/00; H04N 4/08; G06F 15/16
(52) U.S. Cl. ....................... 348/467; 348/469; 348/465; 348/470; 348/473; 348/845.1; 348/845; 709/247; 709/231
(58) Field of Search ................................. 348/465, 467, 348/469, 470, 473, 845.1, 845; 358/405; 375/240.27, 240.26; 709/231, 247

(56) References Cited

U.S. PATENT DOCUMENTS

| | | | | |
|---|---|---|---|---|
| 3,705,263 A | * | 12/1972 | Rittenhouse | ................ 178/6.8 |
| 5,128,776 A | * | 7/1992 | Scorse et al. | ................ 358/432 |
| 5,289,276 A | * | 2/1994 | Siracusa et al. | ............ 348/467 |
| 5,426,513 A | * | 6/1995 | Scorse et al. | ................ 358/433 |
| 5,767,797 A | * | 6/1998 | Yogeshwar et al. | ........... 341/50 |
| 5,940,117 A | * | 8/1999 | Hassan et al. | ................. 348/13 |
| 5,991,816 A | * | 11/1999 | Percival et al. | ............. 709/247 |
| 6,040,879 A | * | 3/2000 | Park | ........................ 348/845.1 |
| 6,108,379 A | * | 8/2000 | Shikakura et al. | .......... 375/240 |
| 6,124,881 A | * | 9/2000 | Terui et al. | .................... 348/15 |
| 6,154,495 A | * | 11/2000 | Yamaguchi et al. | ... 375/240.26 |

* cited by examiner

Primary Examiner—John Miller
Assistant Examiner—Paulos Natnael
(74) Attorney, Agent, or Firm—Sughrue Mion, PLLC

(57) ABSTRACT

A video data transmitting method for transmittin a video data from a transmitter to a receiver comprises the steps of dividing one screenful of video data into specified rectangular areas, generating at least two types of video data (first and second video data) each having different resolution from video data existing in the rectangular areas, and transmitting the two types of video data as one video data (video data for transmission).

19 Claims, 6 Drawing Sheets

A SCREENFUL OF VIDEO DATA 301

FIG.3B $$V1 = \frac{D1+D2+D3+D4}{4}$$

$$V2 = \frac{V11+V12+V13+V14}{4}$$

FIG.5A

VIDEO DATA FOR TRANSMISSION

| V11 | V12 |
|---|---|
| V13 | V14 |

FIG.6B

| V11 | V12 |
|---|---|
| V2 | V14 |

VIDEO DATA TRANSMITTING METHOD

FIELD OF THE INVENTION

The present invention relates to a video data transmitting method employed when video data is transmitted from a transmitter to a receiver and more particularly, to a video data transmitting method which can reduce a loss in the data by generating a video data from at least two video data having different resolution and then transmitting the generated video data as one unit of data for transmission.

BACKGROUND OF THE INVENTION

A digital video input device such as a conventional type of CCD camera has CCDs (solid-state image pickup devices or light-receiving elements) arranged in a matrix. The CCDs perform photoelectric conversion based on amplitude of inputted light. The data obtained by the CCDs is scanned at a prespecified sampling cycle to obtain voltage values. The analog voltage values are converted into digital data, and inputted as video data to a receiver.

Thus, video data inputted in one scan represents a data for all of the CCDs arranged in the matrix. In other words, all the CCDs arranged in the matrix form are considered as forming one screen, and one screenful of video data is inputted in one scan. For example, when the digital video input device is a digital camera, one screenful of video data inputted in one scan corresponds to a sheet of static image. When the digital video input device is a video camera, tens of scan per unit time are successively performed and tens of screenful of video data per unit time (namely, moving images) are inputted.

When the video data is transmitted, for example, from a digital input device to a display unit such as a CRT or from a storing device (or a storage medium) in which the video data is stored to other equipment, video data is outputted in the same order as that of scanning and is received by a receiver for displaying or storing therein. When video data is to be transmitted through a communication line, it is compressed or divided into frames according to a communication protocol for transmission, however, the original data is the same.

With the conventional technology described above, if data is lost during transmission due to any reason, incomplete image data is received by a receiver because information (data indicating density or brightness) for one pixel or area transmitted once or transmitted for transfer of one image data is grouped into one unit.

Especially, when the transmitter is a CCD camera and the receiver is a memory device or the like, a data is transmitted from the CCD camera only once, this may create a serious problem when a video data having a missing portion is stored in the memory device. In addition, when the transmitter is a scanner and the receiver is a printer, a serious problem may also come up if video data (image data) having a missing portion is outputted, since the video image received by the printer is outputted onto a paper in real time.

SUMMARY OF THE INVENTION

It is an object of the present invention to provide, for solving the problems described above, a video data transmitting method that can reduce data loss.

Other objects and features of this invention will become clear from the following description with reference to the accompanying drawings.

In the transmitting method of the present invention, at least two types of video data having different resolution is generated from the original video data, and the two types of video data is transmitted as one data, so that it is possible to provide a video data transmitting method which can reduce loss of data.

In the transmitting method of the present invention, a screenful of video data is dividing into a plurality of first rectangular areas, a first video data corresponding to each of the first rectangular area is generating from the video data in that particular first rectangular area, many of the first rectangular areas are grouped into a plurality of second rectangular areas; a second video data corresponding to each second rectangular area is generating from the first video data in that second rectangular area, the first and second video data is combining as a unit of video data for transmission and the combined video data is transmitted to the receiver, it is checked whether each of the first video data comprising each of the second rectangular area exists without any data loss, and when each of the first video data comprising each of the second rectangular area exists without any data loss, the first video data is considered as inputted video, and when a portion of the first video data comprising each of the second rectangular area is found to be lost, then the second video data is considered as an inputted video data, so that it is possible to provide a video data transmitting method which can reduce loss of data.

In the transmitting method of the present invention, a screenful of video data is dividing into a plurality of first rectangular areas, a first video data corresponding to each of the first rectangular area is generating from the video data in that particular first rectangular area, many of the first rectangular areas are grouped into a plurality of second rectangular areas; a second video data corresponding to each second rectangular area is generating from the first video data in that second rectangular area, the first and second video data is combining as a unit of video data for transmission and the combined video data is transmitted to the receiver, it is checked whether each of the first video data comprising each of the second rectangular area exists without any data loss, and when each of the first video data comprising each of the second rectangular area exists without any data loss, the first video data is considered as inputted video, and when a portion of the first video data comprising each of the second rectangular area is found to be lost, then deciding the first and second video data as an inputted video data and generating a screenful of video data from each of the first and second video data, so that resolution is prevented from its lowering and in addition, loss of data can be reduced.

DESCRIPTION OF THE PREFERRED EMBODIMENTS

Detailed description is made hereinafter for a video data transmitting method according to the present invention in the order of Embodiment 1 and Embodiment 2 with reference to the related drawings.

A video data transmitting method according to Embodiment 1 is realized by dividing, when video data is to be transmitted from a transmitter to a receiver, one screenful of video data into many rectangular areas having specific size. Then, at least two types of data having different resolution are generated from video data of each rectangular area, and the two types of data are transmitted as one data.

Figure 1:
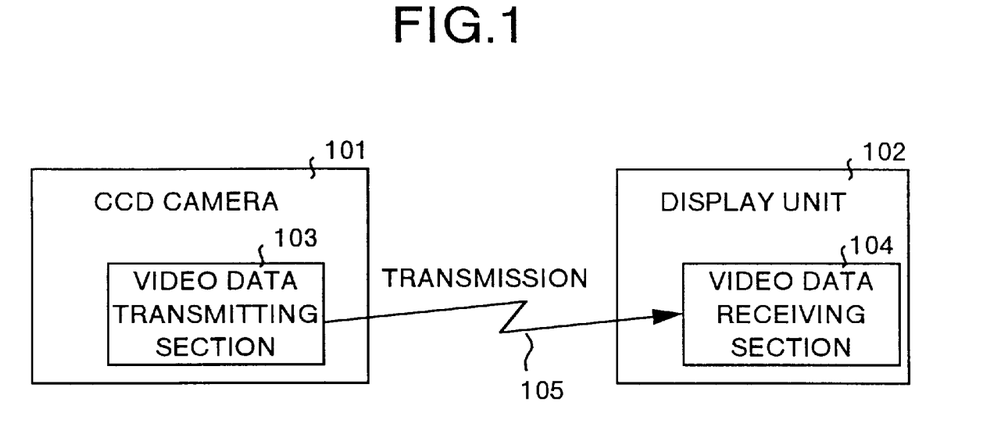
FIG. 1 is an explanatory view showing an example of a transmitter and a receiver in which a video data transmitting method according to Embodiment 1 is applied.

FIG. 1 shows an example of a transmitter and a receiver in which the video transmitting method according to Embodiment 1 is applied. It is assumed here that a CCD camera (digital video input device) 101 is provided as a transmitter of video data, and a display unit 102 for displaying video data is provided as a receiver.

It should be noted that the CCD camera 101 comprises a video data transmitting section 103 for generating and transmitting first and second video data described later. The display unit 102 comprises a video data receiving section 104 for processing of checking of loss of data, deciding which of the first and/or the second video data as the data to be inputted as described later.

The video data transmitting section 103 of the CCD camera 1 is connected to the video data receiving section 104 through a cable 105.

There is no particular limitation over a transmitter and a receiver used in this invention. For instance, a CCD camera may be provided as a transmitter and a storage device may be provided as a receiver. Alternatively, a scanner may be provided as a transmitter and a printer may be provided as a receiver. A data bus, a cable, or wire/radio communication units may be used to connect the transmitter and the receiver.

Figure 2A:
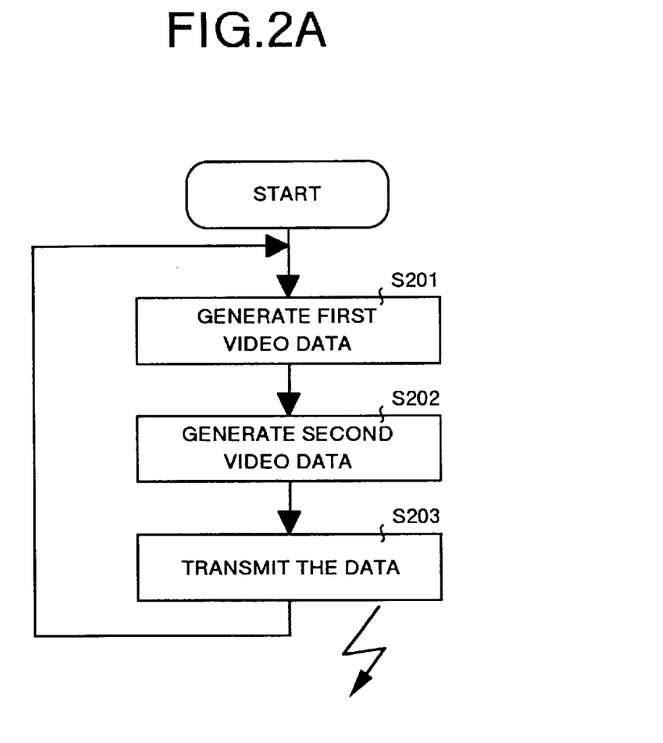
FIG. 2A is a flow chart of processing for transmitting video data in a video data transmitting section according to Embodiment 1.
Figure 2B:
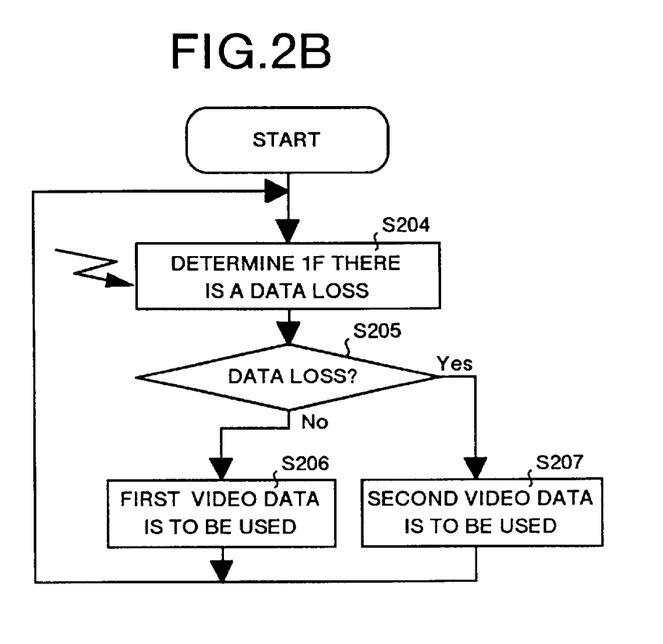
FIG. 2B is a flow chart of processing for receiving video data in a video data receiving section according to Embodiment 1.

Operations of the devices each having the configuration described above is explained with reference to FIGS. 2A and 2B. FIG. 2A shows a flow chart of processing for transmission of data by the video data transmitting section 103, and FIG. 2B shows a flow chart of processing for reception of data by the video data receiving section 104.

Video data transmitting section 103 executes an operation for separating first video data for each first rectangular area from a screenful of video data, which first video data is a data corresponding to each pixel of a preset $2^n \times 2^n$ pixels comprising each of the first rectangular area. The video data transmitting section 103 also allocates specific address data and a time code correlated to a corresponding screen to each of the generated first video data (S201).

Figure 3A:
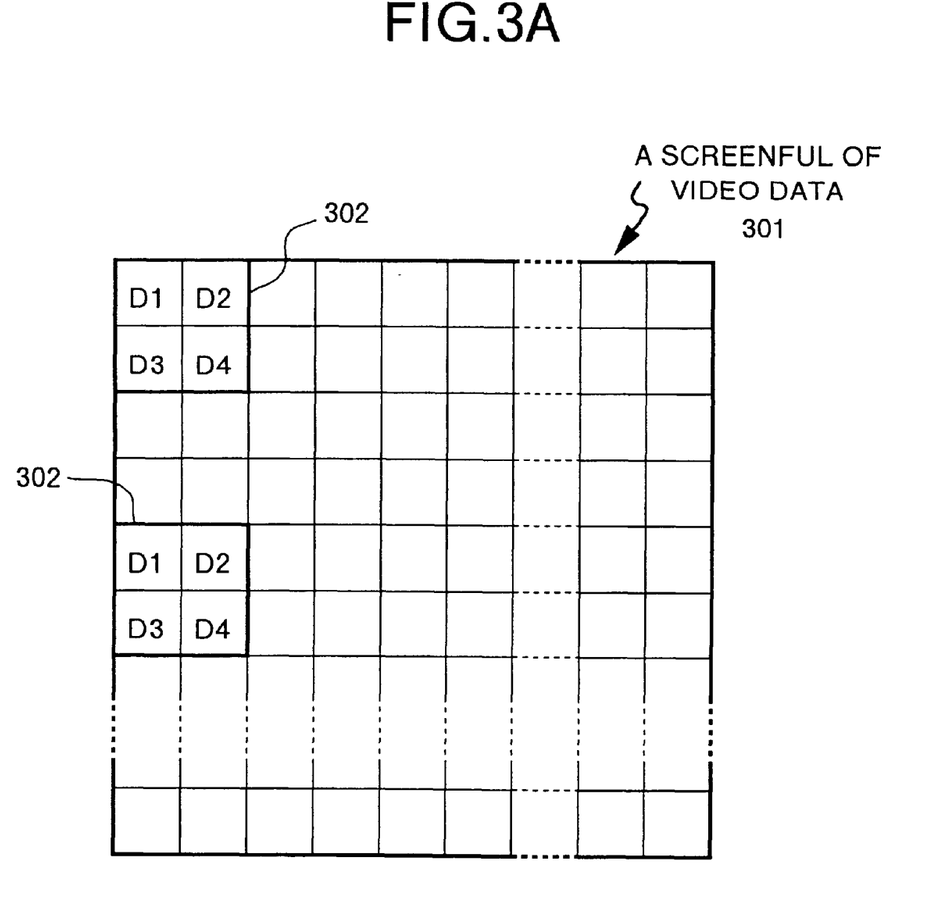
FIGS. 3A and 3B are explanatory views showing a particular example of processing for generating first video data assuming that a value of n is 1 in Embodiment 1.
Figure 3B:
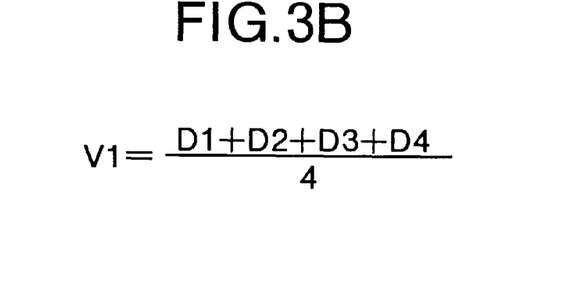

Description is made specifically here for the processing of generating the first image data assuming that the value of n is one with reference to FIG. 3A. As shown in FIG. 3A, by using a first rectangular area 302 having a size corresponding to 2×2 pixels in a screenful of video data 301 transmitted from the CCD camera 101, first video data V1 is generated, as shown in FIG. 3B, from four pixels of video data D1 to D4 within the first rectangular area 302. Herein, it is considered that the first video data V1 is obtained by computing an average of corresponding four pixels of video data D1 to D4, however, a maximum value or a minimum value of the corresponding four pixels of video data may be used, and there is no particular limitation. Then, specific address data and time code correlated to the corresponding screen are allocated to each of the generated first video data V1. It is assumed herein that address data specific to each of the first video data V1 is set according to addresses of the four pixels within the first rectangular area 302 used for generation. As for time code, it is also assumed that the same time code is allocated to all of the first video data V1 generated from one screen.

Then, returning to FIG. 2A, the video data transmitting section 103 executes an operation for generating second video data by receiving the first video data generated in step S201, setting a second rectangular area corresponding to a size having 2×2 units of first rectangular area as one unit of data, generating second video data from 2×2 units of first video data within the second rectangular area, and allocating specific address data as well as time code correlated to a corresponding screen to each of the generated second video data (S202).

Figure 4A:
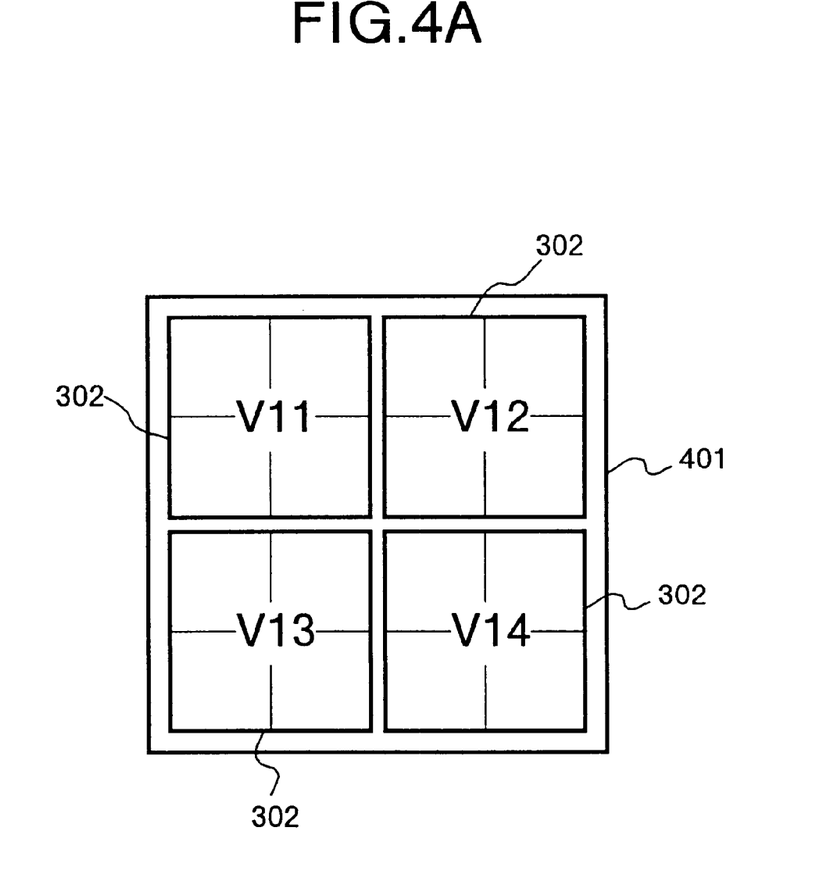
FIGS. 4A and 4B are explanatory views showing a particular example of processing for generating second video data in Embodiment 1.
Figure 4B:
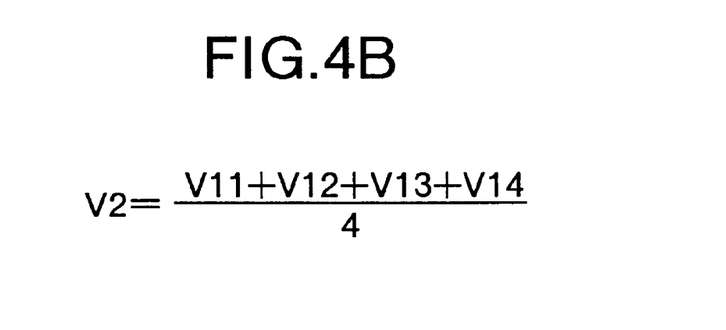

Next description is made specifically for the processing of generating the second image data with reference to FIGS. 4A and 4B. As shown in FIG. 4A, by using a second rectangular area 401 corresponding to the size having 2×2 units of first rectangular area 302, second video data V2 is generated, as shown in FIG. 4B, from four units of first video data V1 to V14 within the second rectangular area 401. Herein, it is considered that, the second video data V2 is obtained by computing an average of corresponding four units of first video data V1 to V14, however, for example, a maximum value or a minimum value of corresponding four units of first video data may be used, and there is no particular limitation. Then, specific address data and time code correlated to the corresponding screen are allocated to each of the generated second video data V2. It is assumed here that address data specific to each of the second video data V2 is set according to addresses of four units of first video data within the second rectangular area 401 used for generation. As for the time code, it is also assumed that the same time code as the first video data V1 is allocated to each of the second video data.

Then, returning to FIG. 2A again, the video data transmitting section 103 executes an operation of transmitting an assembly of the second video data and the first video data V1 (V11 to V14) used for generating corresponding second video data as one unit of video data (S203).

The video data receiving section 104 decides, as shown in FIG. 2B, whether there is a data loss in the video data received from the video data transmitting section 103 and determining whether each data in 2×2 units of first video data V1 (V11 to V14) exists without any data loss or not (S204). Specifically, there are steps of, for example, recognizing the first video data V1 and second video data V2 according to the address data allocated to each of the first video data V1 (V11 to V14) as well as to the second video data V2, further generating a dummy second video data G2 in the same manner as the second video data V2 is generated in step S202 by using the recognized first video data V1, comparing the dummy second video data G2 to the second video data V2, and when G2 is equal to V2 it is considered that there is no data loss.

Then, the video data receiving section 104 decides, when it is determined that all the first video data V1 exists without any data loss, the first video data V1 as inputted video data, and stores the first video data V1 (V11 to V14) in a screenful of video data according to the address data and the time code allocated to each of the first video data V1 (S205, S206).

On the other hand, the video data receiving section 104 decides, when it is determined that a portion of the first video data V1 is missing, the second video data V2 as inputted video data, and stores the second video data V2 in the screenful of video data according to the address data as well as to the time code allocated to the second video data V2 (S205, S207).

Figure 5A:
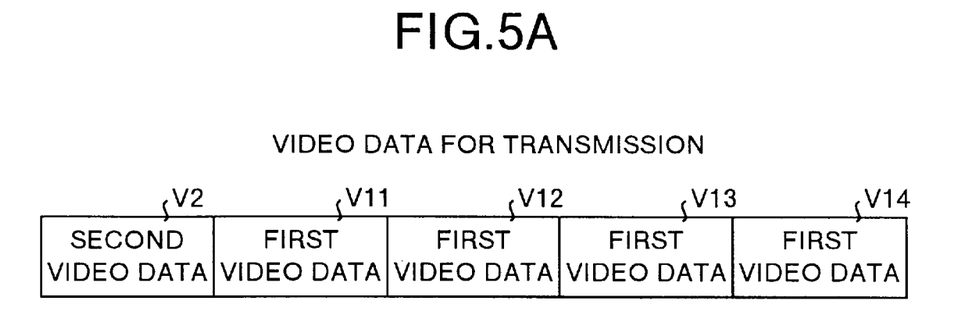
FIGS. 5A to 5C are explanatory views showing each state of video data transmitted from a video data transmitting section as well as of one screenful of video data received by the video data receiving section in Embodiment 1.
Figure 5B:
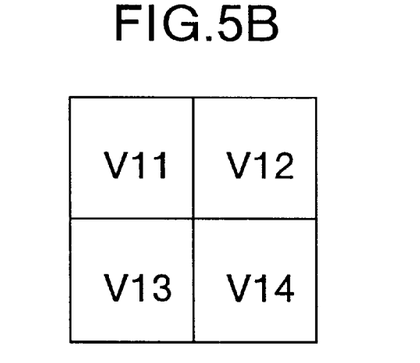
Figure 5C:
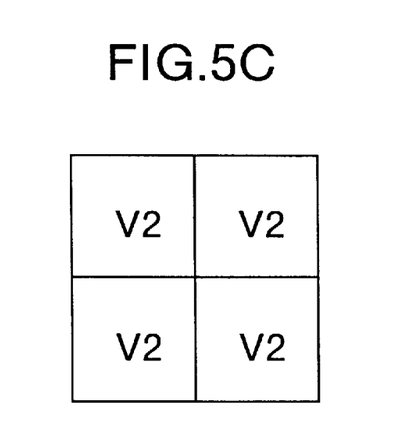

FIGS. 5A to 5C are explanatory views showing video data for transmission transmitted from the video data transmitting section 103 and a state of a screenful of video data after being inputted by the video data receiving section 104. As shown in FIG. 5A, a video data contains one unit of second video data V2 and four units of first video data V11 to V14. Address data and time code are not shown in this figure to make the description simple.

When video data for transmission is to be decided from one unit of video data, in step S206, if it is decided that the first video data is the inputted data, as shown in FIG. 5B, the video data is filled with the first video data V11 to V14.

On the other hand, in step S207 if it is decided that the second video data is the inputted data, as shown in FIG. 5C, the video data is filled with the second video data V2.

With Embodiment 1 described above, when video data is to be transmitted from a transmitter to a receiver, one screenful of video data is divided into a number of rectangular areas, at least two types of video data each having different resolution are generated from video data existing in the each rectangular area, and the generated two types of video data are transmitted as one unit of video data, so that, even if some of the data is lost during transmission of the video data, the receiver can receive video data without any loss of the data. In other words, loss of data can be reduced.

Although the description above has assumed the case, in Embodiment 1, where the first video data is corrected with the second video data when any of the first video data is lost, it is needless to say that the second video data can be prepared with the first video data when a portion of the second video data is lost.

In addition, although the description above has assumed the case, in Embodiment 1, where two types of video data of the first video data and second video data generated in the transmitter are transmitted as one data transmission unit of video data, a third video data may be generated for the second video data so that both of the data has the same relation as that between the first video data and the second video data, and these three types of video data may be transmitted as one data transmission unit of video data. In this case, the receiver can correct losses of data with those three types of video data.

A video data transmitting method according to Embodiment 2 which has the same configuration as that in Embodiment 1 changes only the contents of the processing for deciding the second reception (S207 in FIG. 2B) in the video data receiving section 104.

When it is determined that a portion of the four units of first video data is lost, the existing first video data V1 and the second video data V2 are decided as inputted video data, the first video data V1 is stored in a screenful of video data according to the address data and time codes allocated to the existing first video data, and then the second video data V2 is stored in a section corresponding to the address of the lost data of the first video data V1.

Figure 6A:
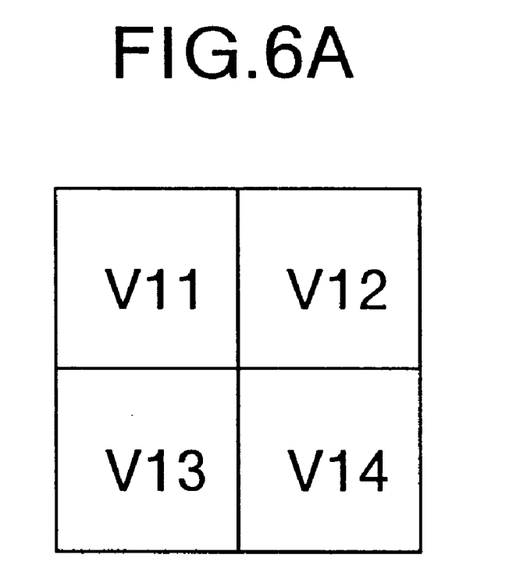
FIGS. 6A and 6B are explanatory views each showing a state of one screenful of video data received by the video data receiving section in Embodiment 2.
Figure 6B:
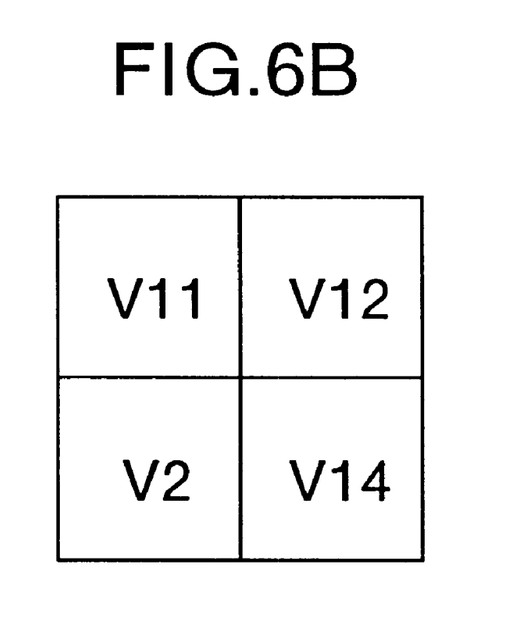

FIGS. 6A and 6B are explanatory views each showing a state of one screenful of video data after being received by the video data receiving section 104 in Embodiment 2. When video data for transmission is to be decided from one unit of video data, when it is decided that the first video data is the inputted data, as shown in FIG. 6A, the video data is filled with the first video data V11 to V14.

On the other hand, when it is decided that the second video data is the inputted data, as shown in FIG. 6B, when there are three properly received first video data V1, for instance, V11, V12 and V14, the properly received first video data V1 (V11, V12, V14) is stored in a screenful of video data, and then the second video data V2 is stored in a section corresponding to the address of the lost first video data V13.

With Embodiment 2 described above, the same effect can be obtained as that of Embodiment 1, and the first video data V1 having further higher resolution is used as much as possible, so that high resolution can be maintained and in addition loss of data can be reduced.

It should be noted that, in Embodiment 1 and Embodiment 2, the first video data and the second video data are generated using the first rectangular areas having one size. However, the processing of generating the first and second video data and processing of transmission of the data may be repeated for a plurality of times by changing the value of n that defines the size of the first rectangular area, and the first video data and the second video data are generated by using the first rectangular areas having a plurality types of size, and the generated data may successively be transmitted.

In this case, it is assumed that the receiver executes the processing of deciding reception so that the first video data and the second video data are used in the descending order of resolution among all of the first video data and second video data each having a different size in the inputted first rectangular areas in one screenful of image data. With this feature, loss of data can further be reduced.

In addition, in Embodiment 1 and Embodiment 2, the description above has assumed, when video data is to be transmitted, the case where both the first video data and the second video data each having different resolution are transmitted in one transmission or in transmission of one unit of video data, three or more data each having different resolution may be transmitted in one transmission or in transmission of one unit of video data.

As described above, in the present invention, a video data transmitting method employed when video data is transmitted from a transmitter to a receiver comprises the steps of dividing one screenful of video data into specified rectangular areas, generating at least two types of video data each having different resolution from video data existing in the rectangular areas, and transmitting the generated two types of video data as one data transmission unit of video data, so that it is possible to provide a video data transmitting method which can reduce loss of data.

In the present invention, a video data transmitting method comprises steps of dividing a screenful of video data into a plurality of first rectangular areas each having $2^n \times 2^n$ (n: natural number) pixels; generating a first video data corresponding to each of the first rectangular area from the video data of the pixels in that particular first rectangular area; allocating a specific address for identification of a position and a time code for identification of the time the original video data was generated to each of the first video data; grouping the 2×2 units of first rectangular areas into a plurality of second rectangular areas; generating a second video data corresponding to each second rectangular area from the first video data in that second rectangular area; allocating a specific address for identification of a position and a time code for identification of the time the original video data was generated to each of the second video data; combining the first and second video data as a unit of video data for transmission and transmitting the combined video data to the receiver; checking whether each of the first video data comprising each of the second rectangular area exists without any data loss; when each of the first video data comprising each of the second rectangular area exists without any data loss, deciding the first video data as inputted video data and generating a screenful of video data from each of the first video data based on the address and time code allocated to each of the first video data; when a portion of the first video data comprising each of the second rectangular area is found to be lost, then deciding the second video data as an inputted video data and generating a screenful of video data from each of the second video data based on the address and time code allocated to each of the second video data, so that it is possible to provide a video data transmitting method which can reduce loss of data.

In the present invention, a video data transmitting method comprises steps of dividing a screenful of video data into a plurality of first rectangular areas each having $2^n \times 2^n$ (n: natural number) pixels; generating a first video data corresponding to each of the first rectangular area from the video data of the pixels in that particular first rectangular area; allocating a specific address for identification of a position and a time code for identification of the time the original video data was generated to each of the first video data; grouping the 2×2 units of first rectangular areas into a plurality of second rectangular areas; generating a second video data corresponding to each second rectangular area from the first video data in that second rectangular area; allocating a specific address for identification of a position and a time code for identification of the time the original video data was generated to each of the second video data; combining the first and second video data as a unit of video data for transmission and transmitting the combined video data to the receiver; checking whether each of the first video data comprising each of the second rectangular area exists without any data loss; when each of the first video data comprising each of the second rectangular area exists without any data loss, deciding the first video data as inputted video data and generating a screenful of video data from each of the first video data based on the address and time code allocated to each of the first video data; when a portion of the first video data comprising each of the second rectangular area is found to be lost, then deciding the first and second video data as an inputted video data and generating a screenful of video data from each of the first video data based on the address and time code allocated to each of the first video data and utilizing the second video data for a portion of the screenful of video data for which the first video data is found to be lost, so that resolution is prevented from its lowering and in addition, loss of data can be reduced.

In the present invention, a step of checking whether each of the first video data comprising each of the second rectangular area exists without any data loss includes a step of recognizing the first and/or second video data based on the address and time code allocated to the respective video data, so that loss of data can be checked accurately.

In the present invention, a step of checking whether each of the first video data comprising each of the second rectangular area exists without any data loss includes, a step of recognizing the first and/or second video data based on the address and time code allocated to the respective video data, a step of generating a dummy second video data from the first video data, a step of comparing the dummy second video data to the second video data in order to check whether each of the first video data comprising each of the second rectangular area exists without any data loss, so that the first video data and/or second video data can be recognized regardless of an order of transmitting the first video data and second video data, which further allows accurate determination of the loss of the data.

In the present invention a value of n which defines the size of a first rectangular area is changed and the steps of dividing a screenful of video data into a plurality of first rectangular areas, generating first video data, allocating a specific address and time code to the first video data, grouping the first rectangular areas into a plurality of second rectangular areas, generating a second video, allocating a specific address and time code to the second video data, combining the first and second video data and transmitting the combined video data to the receiver are repeated for a number of times, so that it is possible to provide a video data transmitting method which can further reduce loss of data.

This application is based on Japanese patent applications No. HEI 9-279505 and No. HEI 10-237728 filed in the Japanese Patent Office on Sep. 26, 1997 and Aug. 24, 1998, respectively, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A video data transmitting method for transmitting a video data from a transmitter to a receiver, comprising the steps of:

dividing one screenful of video data into specified rectangular areas each having $2^n \times 2^n$ (n: natural number) pixels, the video data of said specified areas having a predetermined resolution of at least a first type and a second type;

generating at least two types of video data, each type having different resolution from the predetermined resolution of video data of said rectangular areas; and transmitting said at least two types of video data as one unit of video data for data transmission.

2. A video data transmitting method for transmitting video data from a transmitter to a receiver, comprising the steps of:

dividing a screenful of video data into a plurality of first rectangular areas each having $2^n \times 2^n$ (n: natural number) pixels;

generating a first video data corresponding to each of the first rectangular area from the video data of the pixels in that particular first rectangular area;

allocating a specific address for identification of a position and a time code for identification of the time the original video data was generated to each of the first video data;

grouping the $2^n \times 2^n$ units of first rectangular areas into a plurality of second rectangular areas;

generating a second video data corresponding to each second rectangular area from the first video data in that second rectangular area;

allocating a specific address for identification of a position and a time code for identification of the time the original video data was generated to each of the second video data;

combining the first and second video data as a unit of video data for transmission and transmitting the combined video data to the receiver;

checking whether each of the first video data comprising each of the second rectangular area exists without any data loss;

when each of the first video data comprising each of the second rectangular area exists without any data loss, deciding the first video data as inputted video data and generating a screenful of video data from each of the first video data based on the address and time code allocated to each of the first video data;

when a portion of the first video data comprising each of the second rectangular area is found to be lost, then deciding the second video data as an inputted video data and generating a screenful of video data from each of the second video data based on the address and time code allocated to each of the second video data.

3. A video data transmitting method according to claim 2; wherein said step of checking whether each of the first video data comprising each of the second rectangular area exists without any data loss includes a step of recognizing the first and/or second video data based on the address and time code allocated to a respective video data.

4. A data transmitting method according to claim 2; wherein said step of checking whether each of the first video data comprising each of the second rectangular area exists without any data loss includes, a step of recognizing the first and/or second video data based on the address and time code allocated to a respective video data, a step of generating a dummy second video data from the first video data, a step of comparing the dummy second video data to the second video data in order to check whether each of the first video data comprising each of the second rectangular area exists without any data loss.

5. A video data transmitting method according to claim 2; wherein, a value of n which defines the size of a first rectangular area is changed and the steps of dividing a screenful of video data into a plurality of first rectangular areas, generating first video data, allocating a specific address and time code to the first video data, grouping the first rectangular areas into a plurality of second rectangular areas, generating a second video, allocating a specific address and time code to the second video data, combining the first and second video data and transmitting the combined video data to the receiver are repeated for a number of times.

6. A video data transmitting method for transmitting video data from a transmitter to a receiver, comprising the steps of:

dividing a screenful of video data into a plurality of first rectangular areas each having $2^n \times 2^n$ (n: natural number) pixels;

generating a first video data corresponding to each of the first rectangular area from the video data of the pixels in that particular first rectangular area;

allocating a specific address for identification of a position and a time code for identification of the time the original video data was generated to each of the first video data;

grouping the $2^n \times 2^n$ units of first rectangular areas into a plurality of second rectangular areas;

generating a second video data corresponding to each second rectangular area from the first video data in the second rectangular area;

allocating a specific address for identification of a position and a time code for identification of the time the original video data was generated to each of the second video data;

combining the first and second video data as a unit of video data for transmission and transmitting the combined video data to the receiver;

checking whether each of the first video data comprising each of the second rectangular area exists without any data loss;

when each of the first video data comprising each of the second rectangular area exists without any data loss, deciding the first video data as inputted video data and generating a screenful of video data from each of the first video data based on the address and time code allocated to each of the first video data;

when a portion of the first video data comprising each of the second rectangular area is found to be lost, then deciding the first and second video data as an inputted video data and generating a screenful of video data from each of the first video data based on the address and time code allocated to each of the first video data and utilizing the second video data for a portion of the screenful of video data for which the first video data is missing.

7. A video data transmitting method according to claim 6; wherein said step of checking whether each of the first video data comprising each of the second rectangular area exists without any data loss includes a step of recognizing the first and/or second video data based on the address and time code allocated to a respective video data.

8. A video data transmitting method according to claim 6; wherein said step of checking whether each of the first video data comprising each of the second rectangular area exists without any data loss includes, a step of recognizing the first and/or second video data based on the address and time code allocated to a respective video data, a step of generating a dummy second video data from the first video data, a step of comparing the dummy second video data to the second video data in order to check whether each of the first video data comprising each of the second rectangular area exists without any data loss.

9. A video data transmitting method according to claim 6; wherein, a value of n which defines the size of a first rectangular area is changed and the steps of dividing a screenful of video data into a plurality of first rectangular areas, generating first video data, allocating a specific address and time code to the first vide data, grouping the first rectangular areas into a plurality of second rectangular areas, generating a second video, allocating a specific address and time code to the second video data, combining the first and second video data and transmitting the combined video data to the receiver are repeated for a number of times.

10. A video data transmitting method for transmitting a video data from a transmitter to a receiver, comprising the steps of:

dividing one screenful of video data into specified rectangular areas each having an array of a first plurality of pixels, the video data of said specified area having a predetermined resolution;

generating from video data of said rectangular areas at least a first type and a second type of video data, said second type of video data having a resolution greater than the predetermined resolution and transmitting said at least two types of video data for a common image as one unit of video data for data transmission.

11. The video data transmitting method of claim 10 further comprising allocating a specific address for identifying the position in a time code for each of first and second video data.

12. The video data transmitting method of claim 10 wherein said first video data is generated from $2^n \times 2^n$ pixels and is obtained by computing an average of the corresponding $2^n \times 2^n$ pixels of video data.

13. The video data transmitting method of claim 10 wherein said first video data is generated from $2^n \times 2^n$ pixels and is obtained from computing a maximum value of corresponding $2^n \times 2^n$ pixels of video data.

14. The video data transmitting method of claim 10 wherein said first video data is generated from $2^n \times 2^n$ pixels and is obtained by computing a minimum value of the corresponding $2^n \times 2^n$ pixels of video data.

15. A video data transmitting method of claim 1, wherein:

the resolution of a first type s obtained by a rectangular area defined where n is equal to a first number and a resolution of a second type is obtained by a rectangular area where n is equal to a second number different from the first number.

16. A video data transmitting of method of claim 1, wherein the transmitting of said at least two types of video data as one unit is conducted concurrently.

17. A video data transmitting method of claim 1, wherein the transmitting of said at least two types of video data as one unit is for the purpose of compensating for data loss.

18. A video data transmitting method of claim 10, wherein the transmitting of said at least two types of video data as one unit is conducted concurrently.

19. A video data transmitting method of claim 10, wherein the transmitting of said at least two types of video data as one unit is for the purpose of compensating for data loss.

* * * * *